United States Patent [19]

Robertson

[11] Patent Number: 5,310,059
[45] Date of Patent: May 10, 1994

[54] CASSETTE FOR X-RAY STORAGE PHOSPHOR PLATE

[75] Inventor: Jeffrey C. Robertson, Rochester, N.Y.

[73] Assignee: Eastman Kodak Company, Rochester, N.Y.

[21] Appl. No.: 978,070

[22] Filed: Nov. 18, 1992

Related U.S. Application Data

[63] Continuation of Ser. No. 728,432, Jul. 11, 1991, abandoned.

[51] Int. Cl.$^5$ .................................. B65D 85/48
[52] U.S. Cl. .............................. 206/455; 206/555; 378/187; 378/182
[58] Field of Search .................. 206/1.5, 455, 555; 378/167, 169, 177, 182, 187; 354/275, 281

[56] References Cited

U.S. PATENT DOCUMENTS

| | | | |
|---|---|---|---|
| 2,823,317 | 2/1958 | Fairbank | 378/183 |
| 3,435,511 | 4/1969 | Cooper et al. | 378/182 |
| 3,792,771 | 2/1974 | Bonjean | 206/455 |
| 3,870,889 | 3/1975 | Schmidt | 378/187 |
| 3,928,770 | 12/1975 | Turner | 378/187 |
| 4,063,102 | 12/1977 | Ronci et al. | 378/187 |
| 4,194,625 | 3/1980 | Stievenart et al. | 206/455 |
| 4,295,565 | 10/1981 | Takeuchi | 206/455 |
| 4,339,038 | 7/1982 | Bauer | 206/455 |
| 4,346,300 | 8/1982 | Turner | 206/455 |
| 4,429,412 | 1/1984 | Pierce et al. | 378/182 |
| 4,444,484 | 4/1984 | Best et al. | |
| 4,534,053 | 8/1985 | Eloranta et al. | 378/187 |
| 4,561,544 | 12/1985 | Reeve | 206/1.5 |
| 4,618,062 | 10/1986 | Tomidokoro | 206/455 |
| 4,637,043 | 1/1987 | Bauer | 378/182 |
| 4,681,227 | 7/1987 | Tamura et al. | 378/182 |
| 4,697,902 | 10/1987 | Maehara et al. | 206/455 |
| 4,706,269 | 11/1987 | Reina et al. | 378/167 |
| 4,709,913 | 12/1987 | Cagey | 206/455 |
| 4,782,505 | 11/1988 | Ogo | 378/182 |
| 4,783,588 | 11/1988 | Schmidt et al. | 250/327.2 |
| 4,807,271 | 2/1989 | Covington et al. | 378/182 |
| 4,809,313 | 2/1989 | Gandolfo | 378/182 |
| 4,810,874 | 3/1989 | Torii | 250/327.2 |
| 4,827,136 | 5/1989 | Biship, Jr. et al. | 378/182 |
| 4,838,422 | 6/1989 | Gregerson | 206/455 |
| 4,870,285 | 9/1989 | Ohgoda | 250/327.2 |
| 4,889,233 | 12/1989 | Torii | 378/182 |
| 4,933,696 | 6/1990 | Schmidt et al. | 378/182 |
| 4,975,590 | 12/1990 | Tanaka | 250/327.2 |
| 4,987,308 | 1/1991 | Tamura et al. | 250/327.2 |
| 5,065,866 | 11/1991 | Boutet et al. | 378/182 |
| 5,078,271 | 1/1992 | Bauer | 206/455 |

FOREIGN PATENT DOCUMENTS

| | | |
|---|---|---|
| 0334136 | 3/1989 | European Pat. Off. |
| 0394564 | 4/1989 | European Pat. Off. |
| 0079557 | 11/1991 | European Pat. Off. |
| 89/04998 | 11/1988 | World Int. Prop. O. |

*Primary Examiner*—David T. Fidei
*Attorney, Agent, or Firm*—Dana M. Schmidt

[57] ABSTRACT

A cassette for a photographic element of the kind used in computed radiography comprises a first cassette portion and a second cassette portion that are telescoped together during assembly to form the cassette. The first portion has a rectangular panel and edge walls extending around three side edges of the panel. The second cassette portion comprises a rectangular panel on which the photographic element is permanently secured. An edge wall is attached to one side edge only of the rectangular panel of the second cassette portion and it extends between the edge walls of the first cassette portion when the two portions are assembled together. A locking mechanism carried by the cassette portions holds them together in assembled relation but is easily released by an actuator for removing the second cassette portion and the photographic element so they can be delivered together to a computed radiography reader.

7 Claims, 10 Drawing Sheets

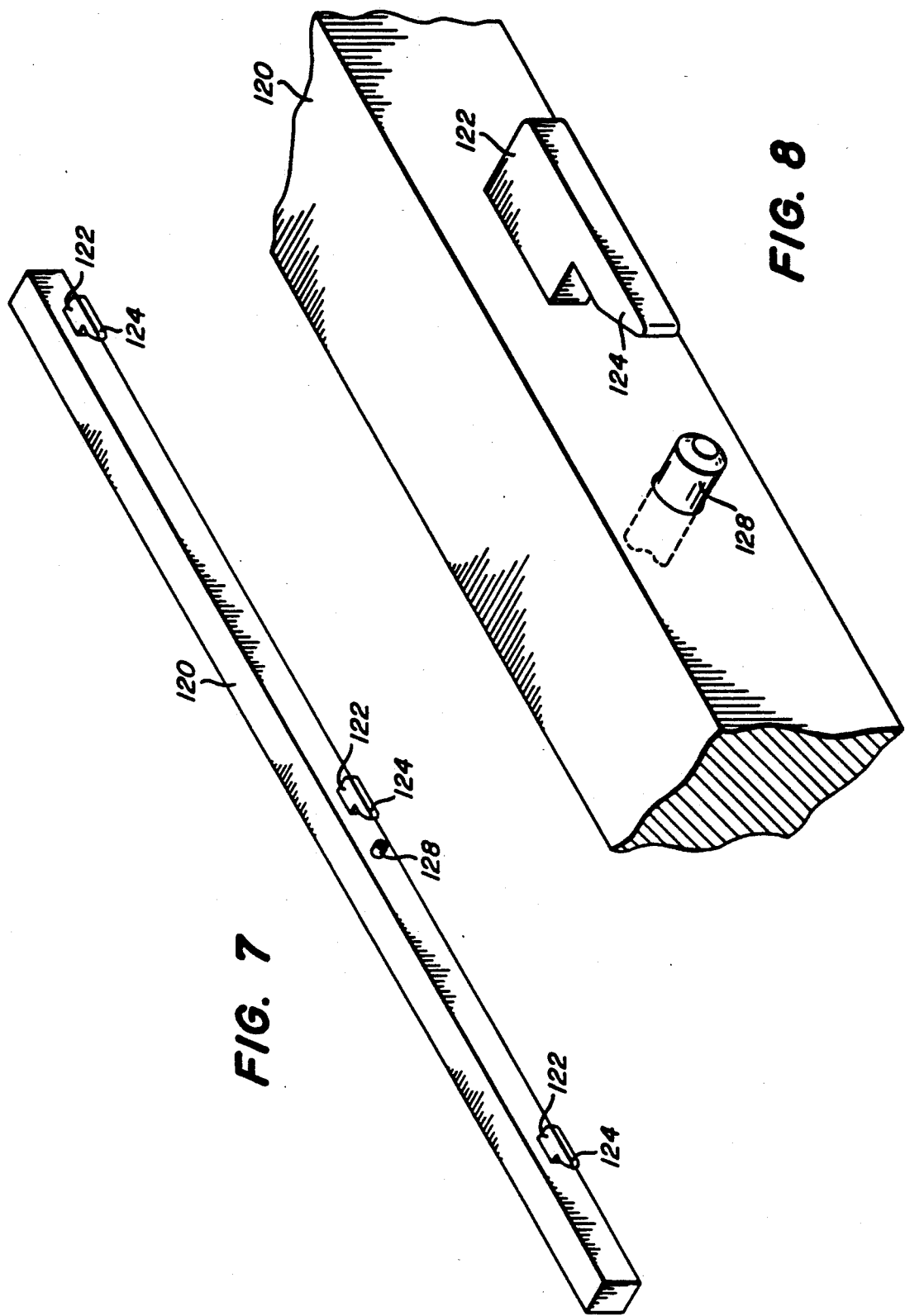

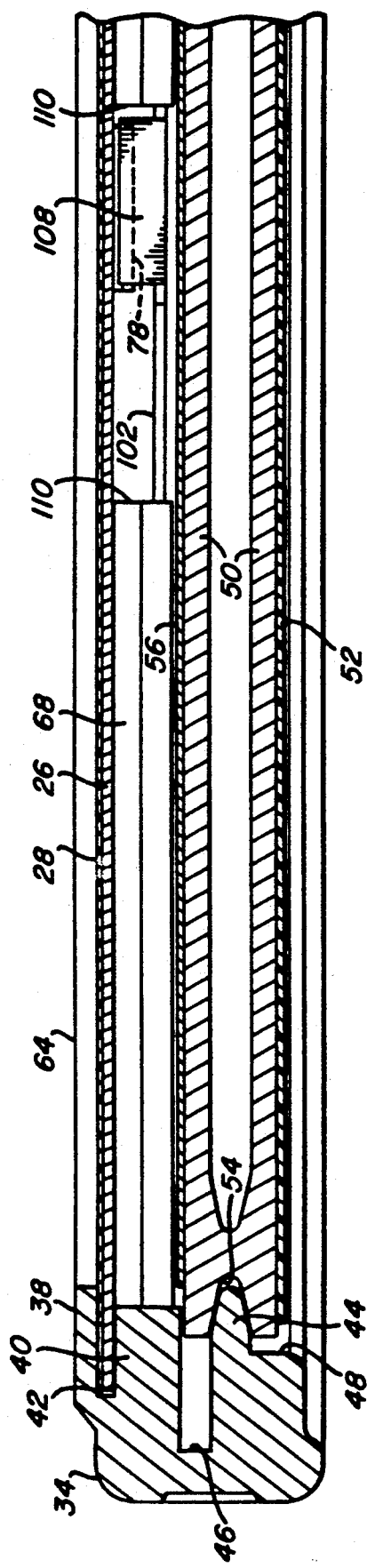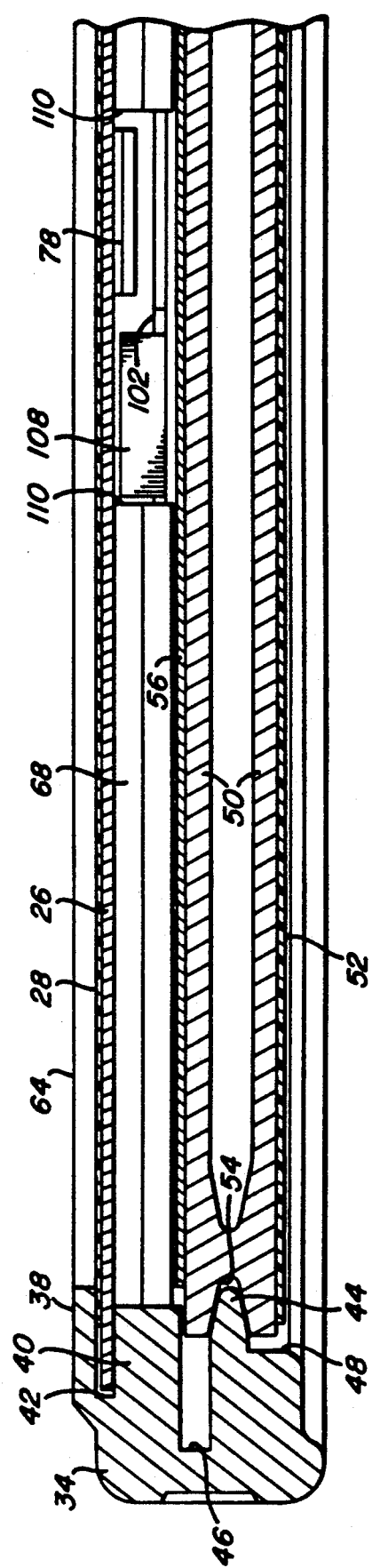
FIG. 9
FIG. 10

CASSETTE FOR X-RAY STORAGE PHOSPHOR PLATE

This is a continuation of application Ser. No. 728,432, filed Jul. 11, 1991, now abandoned.

BACKGROUND OF THE INVENTION

The invention relates to cassettes for photographic elements and, more particularly, to a cassette for an x-ray phosphor film plate of the kind used in computed radiography.

In computed radiography, a photographic element has an image formed thereon by x-rays, and the element is subsequently provided to a reader where the photographic element is stimulated to emit a radiation pattern that is captured for storage and use. Cassettes of the kind used in computed radiography may comprise a container having upper and lower parts that are hinged together so that they can be opened for insertion of a thin, flexible film sheet comprising the photographic element. The cassette is closed and latched so that the cassette with the element therein can be used with an x-ray apparatus to produce an image on the photographic element. Then the cassette is taken to a reader where the cassette must be opened and the photographic element extracted by suitable feeders, such as suction feeding devices. The photographic element separate from the cassette is transported through the reader where it is stimulated to emit a radiation pattern and subsequently erased before being returned to the cassette for re-use.

While cassettes and photographic elements as described above have generally been satisfactory, the cassettes can be relatively expensive, and the flexible photographic elements require special feeding devices for extracting them from the cassette and returning them to the cassette. Accordingly, it is desirable to minimize the cost of the cassette and to simplify delivery of the photographic element to the reader for processing of the image thereon.

SUMMARY OF THE INVENTION

Accordingly, it is an object of the invention to simplify a cassette of the kind used in computed radiography, and to do so in a way which eliminates the need for the usual devices for feeding the photographic element from the cassette.

In accordance with the present invention, a cassette is provided having a first cassette portion with a rectangular panel and walls extending around three side edges of the panel. A second cassette portion has a rectangular panel with the photographic element being permanently secured to and supported by the panel. The panel end element of the second cassette portion is slidably mounted on the first cassette portion so that the second portion can be moved into and out of the first portion. The two portions are latched together when the photographic element is to be exposed to form a latent image thereon. The portions are unlatched so that the second portion can be removed from the first portion and furnished to a reader for processing of the image on the element.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 7 is a perspective view of an extraction bar for unlatching and removing the lower cassette portion;

FIG. 8 is an enlarged fragmentary perspective view of a portion of the extraction bar of FIG. 7;

FIG. 9 is a fragmentary transverse cross section taken along line 9—9 of FIG. 1 showing the latch mechanism in a locked position;

FIG. 10 is a fragmentary cross section similar to FIG. 9, but illustrating the latch mechanism in an unlocked position;

DETAILED DESCRIPTION OF THE PREFERRED EMBODIMENT

Figure 1:
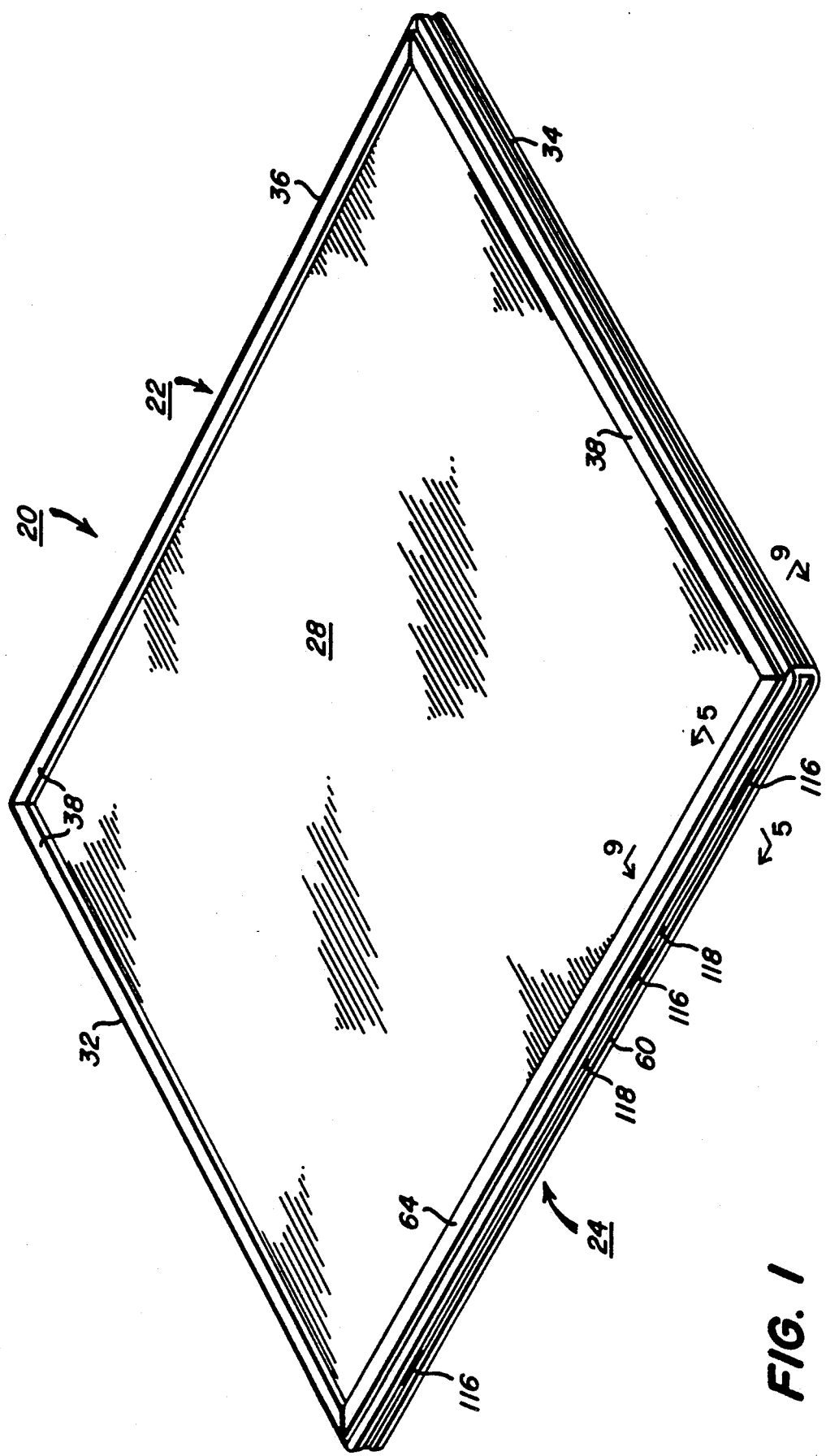
FIG. 1 is a perspective view of a preferred embodiment of a cassette of the invention showing the top, front and one side of the cassette.
Figure 2:
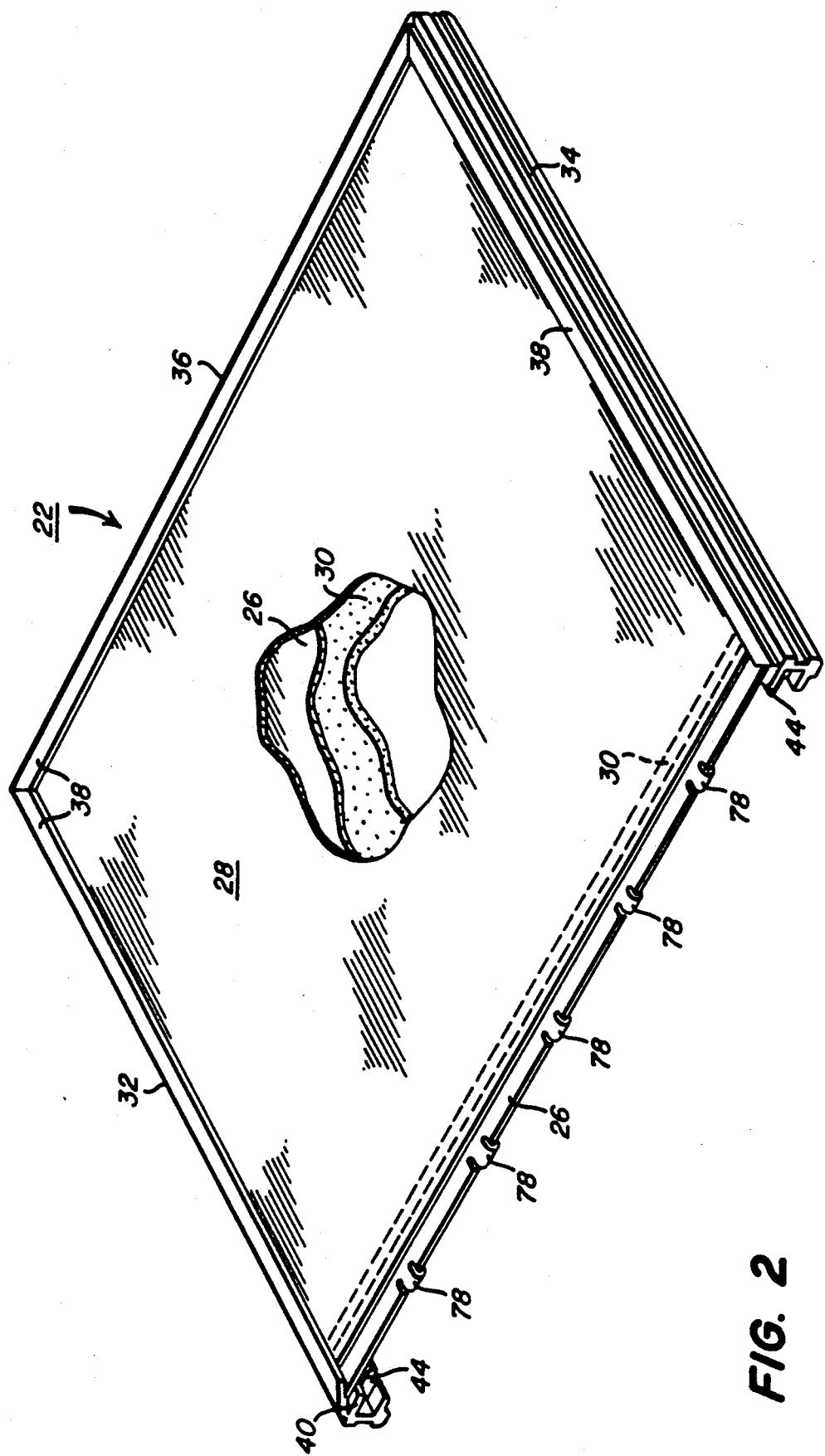
FIG. 2 is a perspective view of the upper portion of the cassette.
Figure 4:
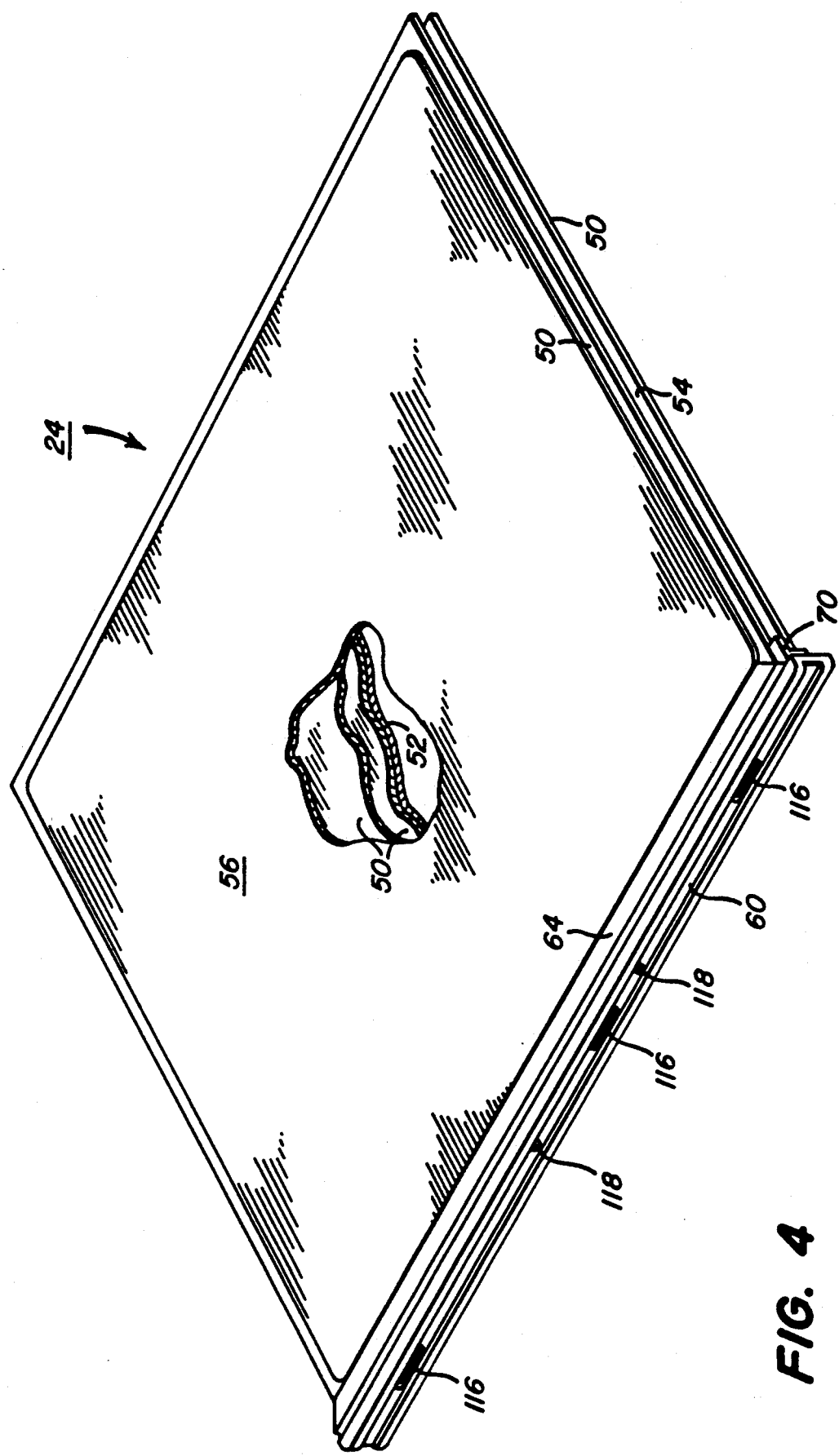
FIG. 4 is a perspective view, partially broken away, of the lower portion of the cassette.

Referring initially to FIGS. 1, 2 and 4, a cassette of the invention is generally designated 20 and comprises an upper cassette portion 22 (FIG. 2) and a lower cassette portion 24 (FIG. 4). As explained in detail later, the lower portion of the cassette includes a photographic element permanently secured to the cassette. The lower portion slides into the upper portion and is latched to it, or it can be removed from the upper portion for processing the image on the photographic element.

Upper portion 22 of the cassette comprises a rectangular panel 26 of aluminum, for example, covered with a cosmetic or protective material, such as a layer of vinyl 28. Preferably, a layer of fabric covered compressible foam 30 (FIGS. 2 and 3) is provided on the inner surface of panel 26. Foam layer 30 protects the photographic element in the lower cassette portion 24 in situations where a patient's weight is applied directly to the cassette during a radiological procedure.

The upper cassette portion has edge walls 32,34 that extend along two opposite sides of the panel 26 and a third edge wall 36 located along one end of the panel and extending between the walls 32,34. Preferably, the edge walls are all mitered at each end thereof so they fit together snuggly at the corners to provide a light tight connection between wall 36 and walls 32,34.

Preferably, edge walls 32-36 are formed from an aluminum extrusion having a cross sectional shape best illustrated in FIGS. 6, 9, 10 and 16. Each of the walls 32-36 comprises a pair of spaced inwardly projecting flanges 38,40 that jointly define a slot 42. The slot 42 of walls 32-36 jointly receive three side edges of the panel 26 and an edge of the layer 28 thereon. Each of the extrusions also includes a tongue 44 which projects inwardly toward the center of the cassette and is spaced below the flange 40 to define therewith a slot 46. A recess 48 is provided beneath the tongue 44. Slot 46, tongue 44 and recess 48 cooperate with the lower cassette portion 24 when the two portions are assembled together to form the cassette, as described in more detail later.

Edge walls 32-36 can be attached to the panel 26 by a suitable adhesive, or by mechanical fasteners (not shown). Also, the intersections between edge wall 36 and the walls 32,34 can receive corner reinforcement blocks which are attached by screws to the edge walls to rigidly secure the edge walls together.

Figure 5:
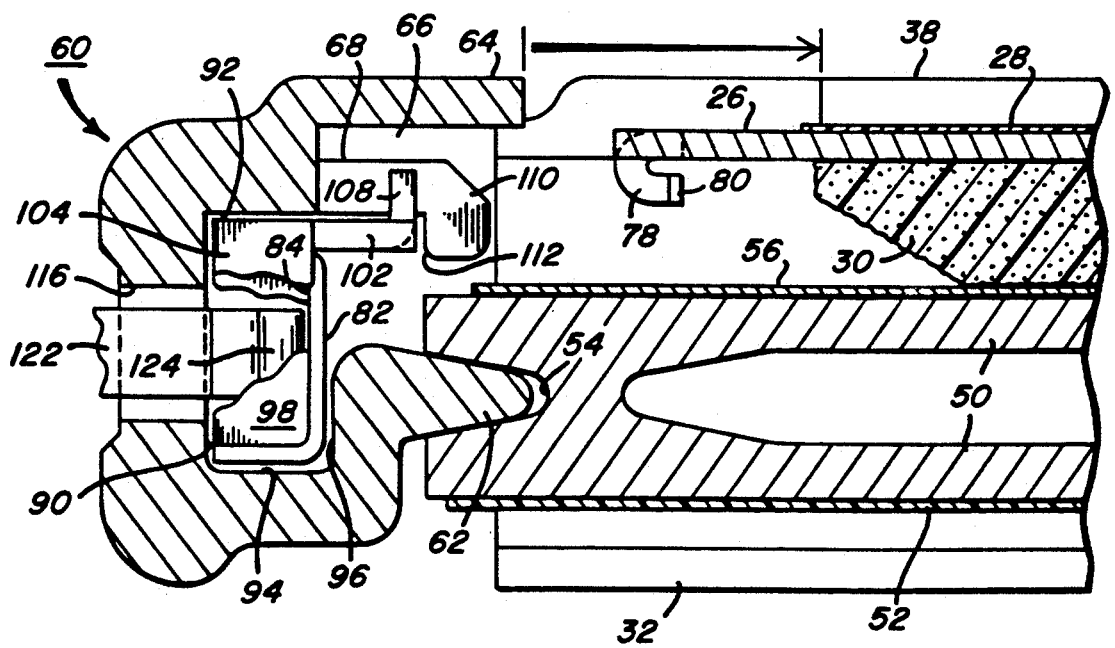
FIG. 5 is an enlarged fragmentary cross section view taken along line 5—5 in FIG. 1, with the lower portion of the cassette being partially removed from the upper portion of the cassette.
Figure 6:
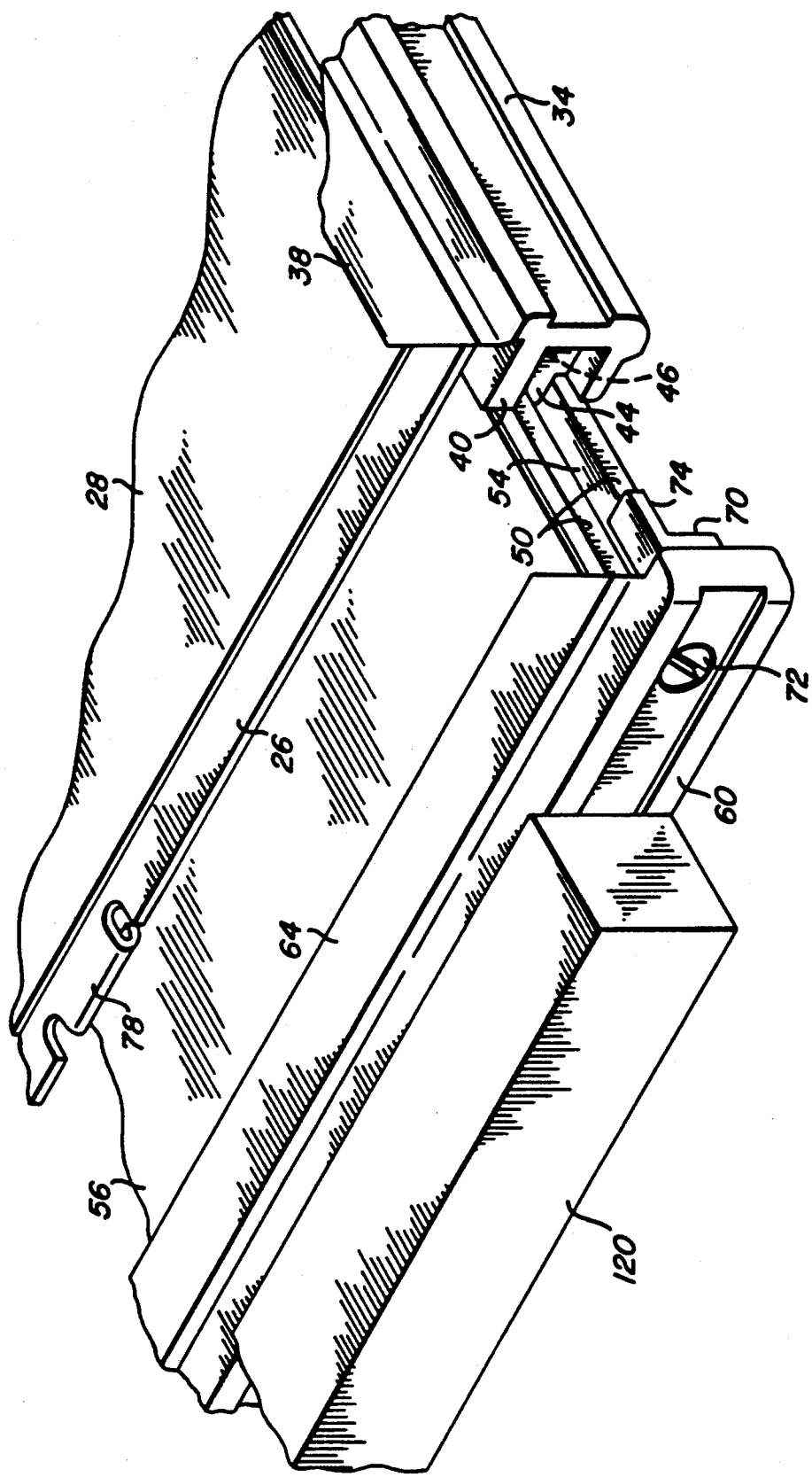
FIG. 6 is a perspective view of the front, top and one side of the cassette, showing the lower portion partially removed from the upper portion and illustrating part of an extraction bar used for unlatching the cassette portions and withdrawing the lower portion from the top portion.

Referring now to FIGS. 4-6, the lower cassette portion 24 comprises a rigid bottom panel 50 which can be manufactured from composite materials, such as epoxy-graphite, or it can be an aluminum honeycomb panel. The bottom surface of panel 50 can be covered with a layer 52 of vinyl or other suitable materials which protect the bottom of panel 50. Layer 52 can be used to provide a cosmetic treatment for the bottom of the cassette.

A groove 54 extends entirely around all four sides of the panel 50 with the groove on two sides and one end of the panel receiving the tongues 44 on edge walls 32-36 of the upper cassette portion when the portions are assembled together, as illustrated in FIGS. 9 and 10. This tongue and groove arrangement provides a light tight juncture between the cassette portions 22,24 when the cassette is closed and latched.

As shown in FIGS. 5, 9 and 10, a photographic element 56, such as a storage phosphor plate is mounted permanently on the top surface of the panel 50 and preferably extends substantially the full length and width of the panel between the walls 32-36.

Secured to one end only of the bottom panel 50 is an edge wall 60 best illustrated in FIGS. 4-6. Wall 60 preferably is formed from an aluminum extrusion and includes an inwardly projecting tongue 62 which fits within the groove 54 on the panel 50 along one side edge of the panel. Tongue 62 is secured to the panel 50 in any suitable manner, such as by an adhesive. A flange 64 at the top of the edge wall is located so that it fits over the upper surface of the front edge of the panel 26 and layer 28 of the upper cassette portion. A slot 66 below the flange receives the panel 26 and layer 28. Slot 66 is formed by the flange 64 and another projecting flange 68 immediately therebelow and spaced above the tongue 62.

Preferably, corner guide reinforcement blocks 70 (FIGS. 4, 6, 11 and 12) are secured by screws 72 to edge wall 60. The reinforcing blocks are generally L-shaped and include an end portion 72 that fit within the slots 46 of edge walls 32 and 34. The outer edges of end portion 72 can be chamfered to facilitate entry of the end portions into the slots 46 and to align the edge walls 32,34 with the edge wall 60 as the cassette portions are assembled together.

Figure 3:
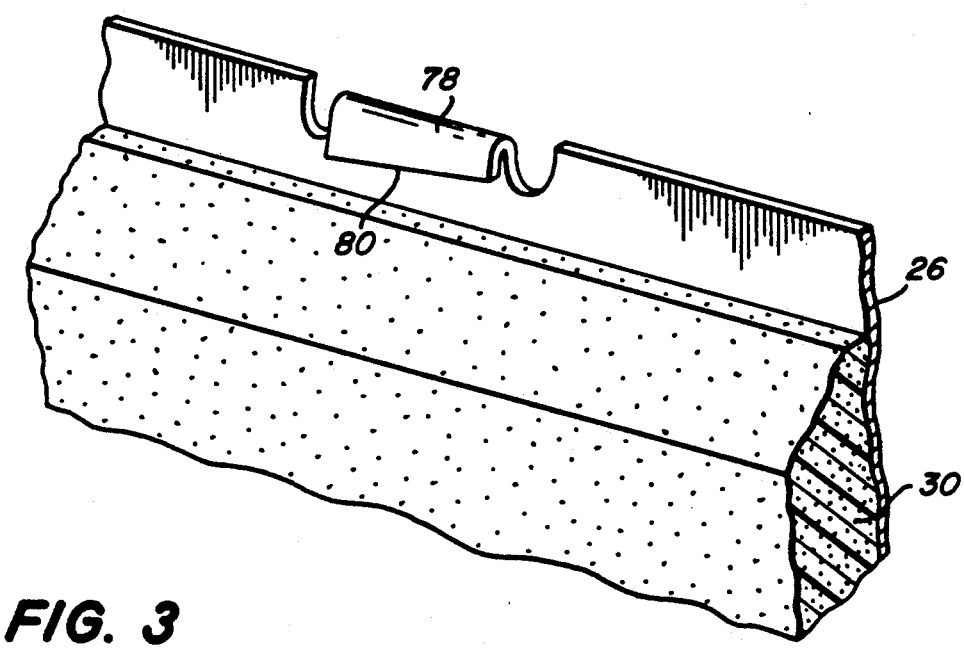
FIG. 3 is an enlarged fragmentary view of a latch member on the upper portion of the cassette.

Referring now to FIGS. 3, 5 and 11-15, cassette portions 22, 24 each have a portion of a latch mechanism generally designated 76. The portion of the latch mechanism on the upper cassette portion 22 comprises a plurality of tabs 78 located on the end of the panel 26 that faces the edge wall 60 of the lower cassette portion 24. Tabs 78 are generally U-shaped and include an end 80 located below the plane of the panel 26 and facing the edge wall 36 at the back end of the cassette portion 22, as best illustrated in FIGS. 3 and 5. End 80 of the tab tapers from one end to the other so that the end of the tab nearest to the end wall 34 is shorter than the end nearest the wall 32. Thus, the end 80 of the tab comprises a cam surface that helps bring the cassette portions tightly together during the latching operation.

Figure 13:
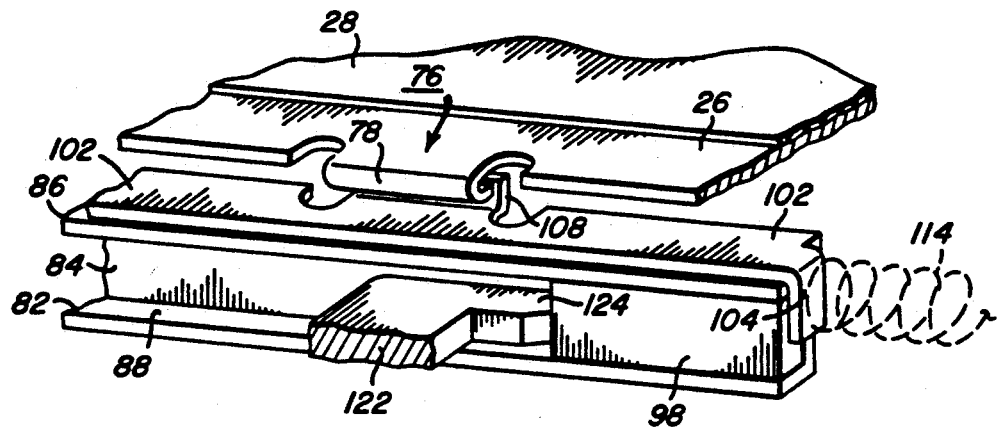
FIG. 13 is a fragmentary perspective view showing a portion of the latch mechanism engaged to latch the cassette portions together.
Figure 14:
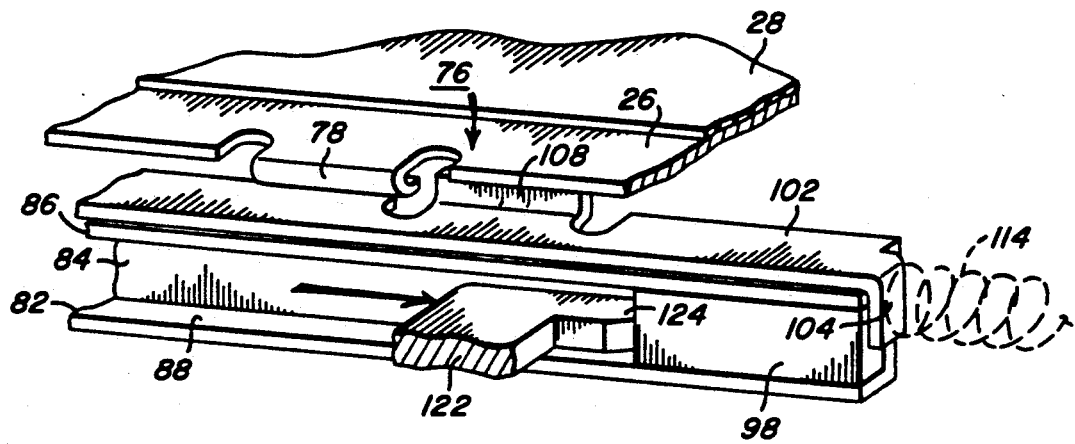
FIG. 14 is a view similar to FIG. 13, but showing the latch mechanism in an unlocked position.
Figure 15:
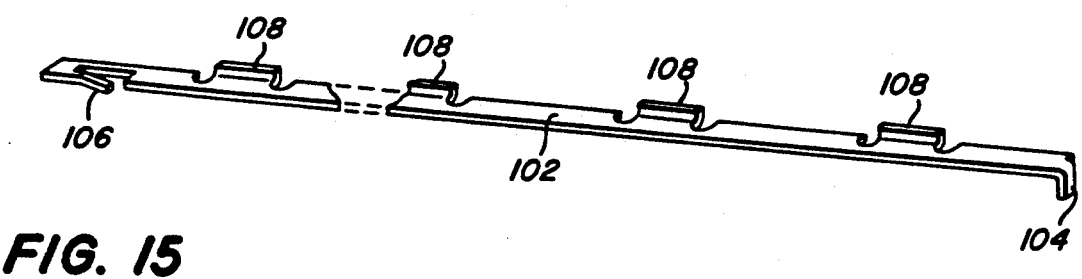
FIG. 15 is a perspective view of the latch bar of the latch mechanism.

The latching mechanism on the lower cassette portion 24 includes a latch actuator 82 best illustrated in FIGS. 5, 13 and 14. Actuator 82 is of channel shape configuration including a base 84 and upper and lower flanges 86 and 88, respectively. Actuator 82 fits within a generally rectangular space in the edge wall 60, the space being defined by walls 90, 92, 94 and 96. The actuator is assembled into the edge wall 60 through the end thereof adjacent cassette edge wall 32. The walls 90-96 are effective to hold actuator 82 against any substantial movement toward or away from the bottom panel 50. Base 84 is perpendicular to bottom panel 50, and flanges 86, 88 project away from the bottom panel 50. The ends of the actuator are closed by blocks 98 (FIGS. 13 and 14) and 100 (FIG. 16).

Figure 16:
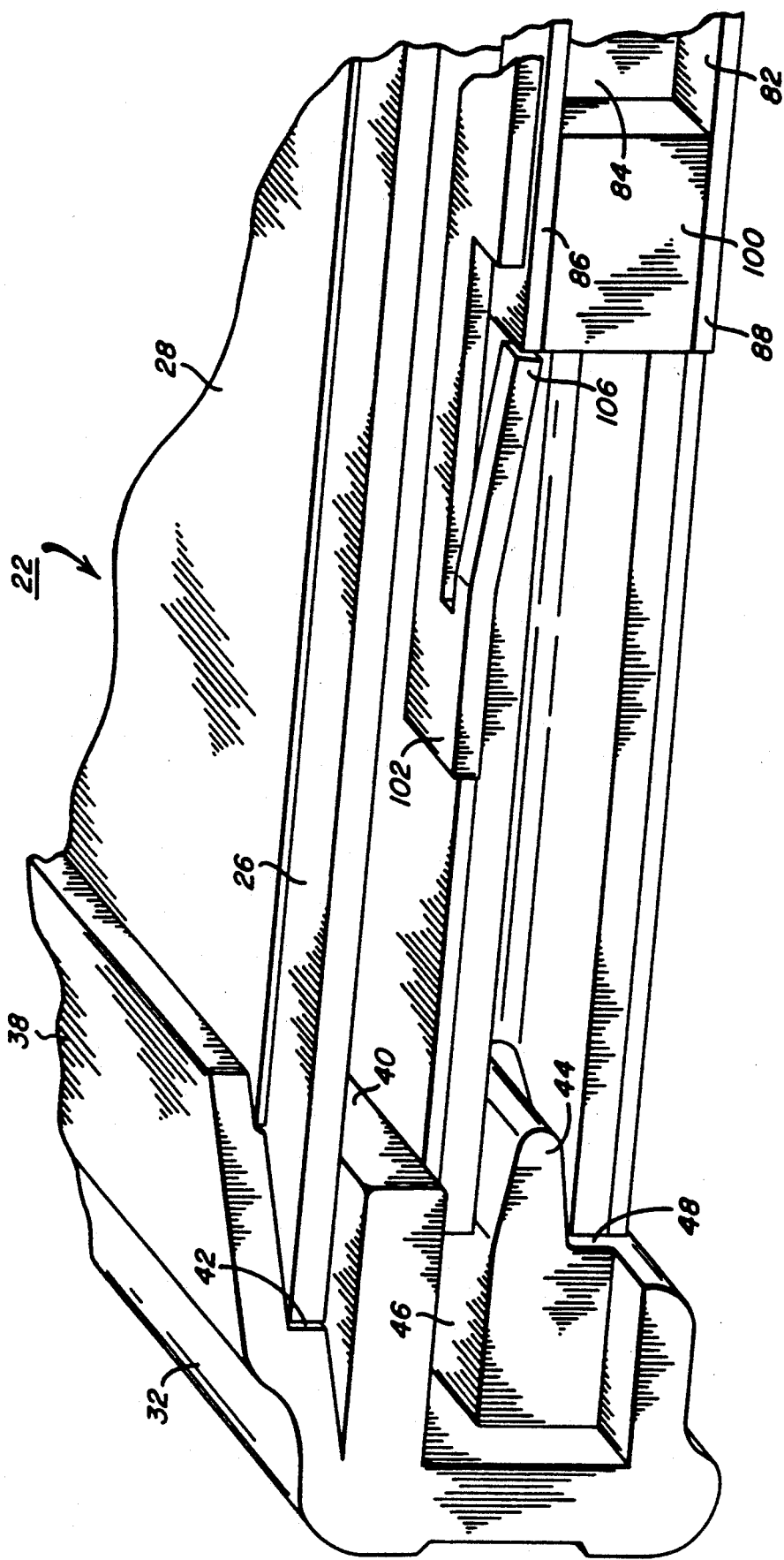
FIG. 16 is an enlarged fragmentary perspective of a portion of the latch mechanism at the front of the cassette.

The latch mechanism further comprises a latch bar generally designated 102 and best illustrated in FIGS. 5 and 13-16. The bar sits on top of flange 86 of the actuator 82 and has a tab 104 at the right end which extends along the right side of the actuator 82 and the block 98. A spring tab 106 on the other end of the bar projects downwardly and engages the flange 86 of the actuator at the left end thereof as illustrated in FIG. 16. Spring tab 106 enables the bar 102 to be positioned within the edge wall 60 and then to have the actuator 82 assembled by feeding it though the left end of the edge wall with tab 106 flexing upwardly as the actuator flange 86 passes therebelow. Then the tab snaps downwardly behind the flange 86 to lock the actuator 82 and latch bar 102 together.

Bar 102 also has a plurality of upwardly projecting hooks or flanges 108 which cooperate with the tabs 78 on panel 26 to latch the cassette portions together as explained in more detail later. The hooks are located along one side edge of the bar 102 and are spaced from each other by a distance equal to the spacing between the tabs 78 on the panel 26. The flange 68 on the edge wall 60 has a plurality of notches 110 (FIGS. 5, 9 and 10) spaced along the length of the flange to receive the hooks 108. The notches are sufficiently long to enable the hooks to be moved in a left to right direction as viewed in FIGS. 11-14 and in a right to left direction in FIGS. 9 and 10. A shoulder 112 (FIG. 5) on the flange 68 is located in the plane of the bar 102 and retains the latch bar against movement to the right as viewed in FIG. 5. Wall 90 prevents movement of the bar to the left as viewed in FIG. 5. Wall 92 and flange 86 limit movement of the bar in a vertical direction.

A spring 114 (FIGS. 11-14) is compressed between the corner guide reinforcement block 70 and the tab 104 on the latch bar so that the latch bar and latch actuator are urged to the left to thereby urge the hooks 108 into engagement with surface 80 of the tabs 78 for locking the cassette portions together. As noted previously, surface 80 tapers from one end to the other. When the hooks engage the surface 80, they slide along surface 80 under the influence of spring 114 and urge the upper cassette portion against the edge wall 60 of the lower cassette portion to thereby latch the cassette portions into closed and locked engagement with each other. The tapered surface 80 also prevents travel of the hooks past the tabs, thereby limiting movement of the hooks and latch bar relative to the tabs.

Edge wall 60 has a plurality of slots 116 (FIGS. 1, 5, 11 and 12) that extend from the outer surface of the edge wall inwardly into the space defined by walls 90-96. Edge wall 60 also has one or more holes 118 located in its outer surface and spaced from the slots 116, as shown in FIGS. 1 and 4.

An extraction bar 120 (FIGS. 7 and 8) is used for unlatching the latch mechanism 76 to enable the lower portion of the cassette to be extracted from the upper portion as occurs, for example, when the lower portion containing the photographic element is to be read by a computed radiography reader unit. The extraction bar is generally rectangular having three fingers 122 which project from one surface of the bar. The fingers 122 each include a base portion connected to the bar and a tip end portion 124 which projects to one side of the base portion.

Figure 11:
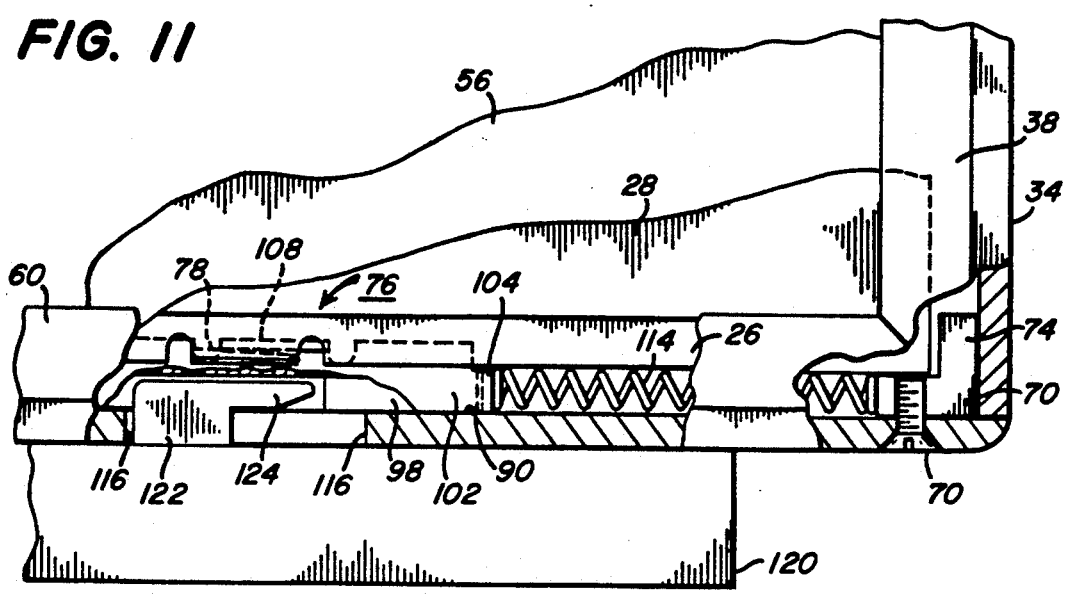
FIG. 11 is a fragmentary plan view, partially broken away, showing the extraction bar engaged with the lower portion of the cassette immediately before the latching mechanism is unlocked.
Figure 12:
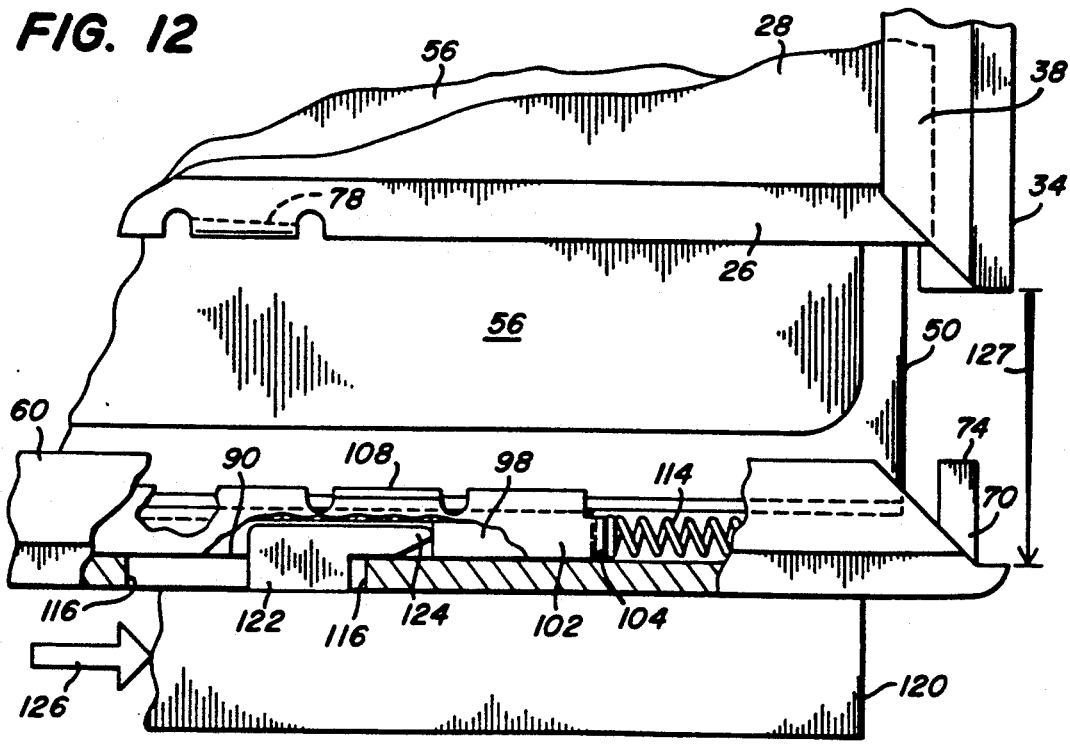
FIG. 12 is a view similar to FIG. 11, but showing the extraction bar moved to unlock the latching mechanism and with the lower cassette portion partially removed from the upper cassette portion.

In operation, the bar 120 is moved up against the face of the edge wall 60 with the fingers 122 extending through the slots 116 in wall 60 in the manner best illustrated in FIGS. 5, 11 and 12. The finger at the right end of the cassette as viewed in FIGS. 11 and 12 initially is spaced slightly from the block 98 in the end of the latch actuator 82. By exerting a force on the bar to the right as shown at 126 in FIG. 12, the bar and fingers are moved to the right, thereby bringing the tip end 124 of the one finger into engagement with the block 98 to displace the block, the latch actuator 82 and the latch bar 102 to the right against the pressure of spring 114. As this occurs, the hooks 108 on the latch bar 102 slide along the surface 100 of tabs 78 until they are completely disengaged from the tabs, thereby unlatching the cassette portions 22, 24 and making it possible for the two portions to be separated. During this movement of the extraction bar 120, the tip end 124 of each of the fingers 122 move past one end of the slots 116 so they are located along the wall 90 of the edge wall 60. Then the extraction bar can be pulled downwardly as viewed in FIGS. 11 and 12 to remove the lower portion 24 of the cassette from the upper portion. This movement is shown by arrow 127 in FIG. 12. The extraction bar 120 can be part of a computed radiography reader, or it can be a separate piece of apparatus used solely for separating the cassette portions from each other.

Bar 120 also has a spring biased pin 128 located adjacent the center finger 122. This pin is located so that when the fingers 122 are positioned in the slots 116 and move to the right as shown in FIG. 12, the pin snaps into one of the holes 118 in the edge wall 60, thereby holding the actuator in this position against inadvertent removal. It is only the tip end of the pin 128 that enters the hole 118. Thus, when it is desired to remove the actuator 120, a positive force exerted in a direction to the left as viewed in FIGS. 11 and 12 will cause the pin to pop out of the hole 118 and allow movement of the actuator to the position shown in FIG. 11 where it can be removed through the slots 116. As this occurs, the hooks 108 travel to the left under the influence of spring 114. Thus, if the two cassette portions are assembled together, this movement of the extraction bar followed by the movement of the latch bar 102 effects latching together of the cassette parts again due to the hooks 108 moving into engagement with the tabs 78.

The cassette of the invention is easy to construct. The upper cassette portion essentially consists of three pieces of a common extrusion forming the walls 32-36 which are secured to the panel 26 and with the inner surface of the panel being covered by the foam layer 30. The lower cassette portion essentially consists of the bottom panel 50 with the photographic element 56 thereon together with a single edge wall 60 which contains the latching mechanism. The latching mechanism is assembled through one end of the wall 60 into the space defined by inner walls 90-96. The cassette portions are easily separated by use of the extraction bar 120 by simply bringing the actuator against wall 60 with fingers 122 in slots 116, and shifting the bar to the right to effect movement of the latch bar 102 for separating the hooks 108 on the bar from the tabs 78 on the panel 26. Then the actuator can be pulled in the direction shown at 127 in FIG. 12 to withdraw the lower portion of the cassette from the upper portion. The rigid panel 50 and the fact that the photographic element is secured permanently thereto, simplifies the handling of the photographic element during removal thereof from the upper cassette portion and handling in a computed radiography reader. Thus, the cassette of the invention does not require special feeding devices, such as suction cups, for removing a flexible photographic element from a cassette, as frequently required in prior cassettes which hold flexible photographic elements. The cassette can be manufactured relatively inexpensively from only a few parts and is easily assembled, thereby reducing the cost of the cassette.

The invention has been described in detail with particular reference to a preferred embodiment thereof, but it will be understood that variations and modifications can be effected within the spirit and scope of the invention.

I claim:

1. A cassette for an image retaining photographic element, the cassette comprising:

a first cassette portion having a rectangular panel and edge walls extending around three side edges of the panel, each of the side walls having a projection facing each other, a second cassette portion comprising a rectangular panel, the photographic element being permanently secured to the panel of the second cassette portion, the panel of the second portion being slideable on the projections of the first cassette portion to move the second portion into and out of the first portion, and latching means carried by the first and second portions for latching the portions in the assembled relationship and for releasing the portions so that the second portion can be removed from the first portion.

2. A cassette as set forth in claim 1, wherein the second cassette portion has at least one slot therein adjacent the latching means providing access to the latching means by an extraction member capable of releasing the latching means and thereby allowing removal of the second cassette portion from the first cassette portion.

3. A cassette as set forth in claim 1, wherein the latching means comprises (1) a tab on the panel of the first cassette portion and (2) a latch bar on the second cassette portion having a hook movable with respect to the tab between a latched position wherein the hook engages the tab and an unlatched position wherein the hook is separated from the tab to enable the second cassette portion to slide out of the first cassette portion, and means for urging the latch bar to its latched position.

4. A cassette for an x-ray storage phosphor plate, the cassette comprising:
a first cassette portion and a second cassette portion,
the first cassette portion having a rectangular panel forming the top of the cassette, the panel having two opposite sides and two opposite ends, three edge walls located along the two opposite sides and one end of the panel, the edge walls each having a groove for receiving the two sides and one end of the panel, and the edge walls each having a projection beneath the panel for engaging the second cassette portion,
the second cassette portion having a second rigid rectangular panel forming the bottom of the cassette, the second panel having a groove in side walls of the panel located to receive the projection on the edge walls of the first cassette portion so that the second cassette portion can slide into and out of the first cassette portion to close and open the cassette, an x-ray storage phosphor plate permanently secured to the upper surface of the second panel so that the plate is between the panels when the cassette portions are closed, the second cassette portion having an edge wall attached to the second panel and extending between the two edge walls on the opposite side walls of the first panel when the cassette portions are closed, and
latching means carried by the first and second cassette portions for latching the cassette portions together when the cassette is closed.

5. A cassette as set forth in claim 4, further comprising a layer of compressible material secured to the panel of the first cassette portion and facing the X-ray plate on the panel on the second cassette portion to protect the plate from pressure exerted on the cassette during a radiological procedure.

6. A cassette as set forth in claim 4, wherein the latching means comprises a plurality of tabs spaced along the second end of the panel on the first cassette portion and facing the panel of the second cassette portion, and a latch bar having a plurality of hooks spaced along the bar, the latch bar being located on the edge wall of the second cassette portion and being movable with respect to such edge wall between a latched position wherein the hooks on the bar engage the tabs and an unlatched position wherein the hooks are separated from the tabs to enable the second cassette portion to be withdrawn from the first cassette portion.

7. A cassette as set forth in claim 6, wherein the latching means further comprises a latch actuator movably positioned within the edge wall on the second cassette portion, the latch bar being coupled to the latch actuator for conjoint movement, a spring positioned in the edge wall on the second cassette portion for urging the latch bar and actuator in a direction to move the latch bar toward its latched position, and the edge wall on the second cassette portion having a slot located with respect to the latch actuator to provide access to the actuator from outside the cassette so that the actuator and latch bar can be moved against the urging of the spring until the latch bar reaches its unlatched position.

* * * * *